United States Patent
Cox et al.

(10) Patent No.: US 9,812,015 B1
(45) Date of Patent: Nov. 7, 2017

(54) SYSTEMS AND METHODS FOR DETERMINING PARKING INFORMATION FOR A VEHICLE USING VEHICLE DATA AND EXTERNAL PARKING DATA

(71) Applicant: METROMILE, INC., San Francisco, CA (US)

(72) Inventors: Evan Gabriel Turitz Cox, Pleasant Hill, CA (US); Joshua Cabrera Primero, San Francisco, CA (US); Muhammad Waliji, San Francisco, CA (US); Dan Richard Preston, Jr., San Francisco, CA (US); Jose Mercado, San Francisco, CA (US); Daniel Eric Goodman, Mountain View, CA (US)

(73) Assignee: METROMILE, INC., San Francisco, CA (US)

( * ) Notice: Subject to any disclaimer, the term of this patent is extended or adjusted under 35 U.S.C. 154(b) by 0 days.

(21) Appl. No.: 14/842,736

(22) Filed: Sep. 1, 2015

Related U.S. Application Data

(60) Provisional application No. 62/044,970, filed on Sep. 2, 2014.

(51) Int. Cl.
   *G08G 1/14* (2006.01)

(52) U.S. Cl.
   CPC .............. *G08G 1/144* (2013.01); *G08G 1/143* (2013.01)

(58) Field of Classification Search
   CPC .......... G08G 1/14; G08G 1/144; G08G 1/145; G08G 1/146; G08G 1/147; G08G 1/148; G08G 1/149; B60H 1/00764; B60H 1/00771; B60H 1/00778
   See application file for complete search history.

(56) References Cited

U.S. PATENT DOCUMENTS

| | | |
|---|---|---|
| 3,812,710 A | 5/1974 | Bauman et al. |
| 4,157,030 A | 6/1979 | Keely |
| 4,673,921 A | 6/1987 | Saito et al. |
| 5,303,163 A | 4/1994 | Ebaugh et al. |
| 5,550,738 A | 8/1996 | Bailey et al. |
| 5,913,917 A | 6/1999 | Murphy |
| 5,921,199 A | 7/1999 | Gross |

(Continued)

FOREIGN PATENT DOCUMENTS

| | | |
|---|---|---|
| GB | 2427498 A | 12/2006 |
| WO | WO 00/17610 A1 | 3/2000 |
| WO | WO 2016/005972 A1 | 1/2016 |

OTHER PUBLICATIONS

Office action dated Dec. 18, 2015 for U.S. Appl. No. 14/177,188.

(Continued)

*Primary Examiner* — Van Trieu
(74) *Attorney, Agent, or Firm* — Wilson Sonsini Goodrich & Rosati

(57) ABSTRACT

The present disclosure provides methods and systems for providing parking information. A method for providing parking information comprises obtaining vehicle data from a vehicle, and/or a mobile computing device, and determining whether the vehicle is parked from the vehicle data. Next, using the one or more programmed processors, a parking location of the vehicle can be determined from the vehicle data. Information about the parking location can then be determined, and the information about the parking location can be outputted to the user.

21 Claims, 6 Drawing Sheets

(56) References Cited

U.S. PATENT DOCUMENTS

| | | | |
|---|---|---|---|
| 6,087,965 A | 7/2000 | Murphy | |
| 6,122,572 A | 9/2000 | Yavnai | |
| 6,141,609 A | 10/2000 | Herdeg et al. | |
| 6,505,106 B1 | 1/2003 | Lawrence et al. | |
| 6,590,534 B1 | 7/2003 | Kroll et al. | |
| 6,694,258 B2 | 2/2004 | Johnson et al. | |
| 6,741,933 B1 | 5/2004 | Glass | |
| 7,532,974 B2 | 5/2009 | Sato et al. | |
| 7,937,278 B1 | 5/2011 | Cripe et al. | |
| 8,022,831 B1 | 9/2011 | Wood-Eyre | |
| 8,090,598 B2 | 1/2012 | Bauer et al. | |
| 8,180,293 B2 | 5/2012 | Jung et al. | |
| 8,280,752 B1 | 10/2012 | Cripe et al. | |
| 8,311,858 B2 | 11/2012 | Everett et al. | |
| 8,332,242 B1 | 12/2012 | Medina, III | |
| 8,498,777 B2 | 7/2013 | Sanchez-Prieto Aler et al. | |
| 8,520,695 B1 | 8/2013 | Rubin et al. | |
| 8,527,140 B2 | 9/2013 | Schwartz et al. | |
| 8,560,216 B1 | 10/2013 | Kahn et al. | |
| 8,610,597 B2* | 12/2013 | Stefik | G06Q 10/02 340/425.5 |
| 8,793,062 B2 | 7/2014 | Fino | |
| 8,799,036 B1 | 8/2014 | Christensen et al. | |
| 8,816,879 B2* | 8/2014 | Stefik | G06Q 10/02 340/425.5 |
| 8,843,307 B1 | 9/2014 | Kolodziej | |
| 8,972,079 B2* | 3/2015 | Harumoto | B60H 1/00657 340/426.14 |
| 9,053,469 B1 | 6/2015 | Bohanek et al. | |
| 9,082,078 B2 | 7/2015 | Palmer et al. | |
| 9,230,425 B2* | 1/2016 | Hamaue | G08C 17/00 |
| 9,372,831 B2* | 6/2016 | Harumoto | G06F 17/00 |
| 2003/0229446 A1 | 12/2003 | Boscamp et al. | |
| 2004/0123837 A1 | 7/2004 | Rado | |
| 2004/0225557 A1 | 11/2004 | Phelan et al. | |
| 2005/0137757 A1 | 6/2005 | Phelan et al. | |
| 2005/0228553 A1 | 10/2005 | Tryon | |
| 2005/0240347 A1 | 10/2005 | Yang | |
| 2006/0042232 A1 | 3/2006 | Fulcher et al. | |
| 2006/0095301 A1 | 5/2006 | Gay | |
| 2006/0111835 A1 | 5/2006 | Baker et al. | |
| 2007/0083327 A1 | 4/2007 | Brice et al. | |
| 2007/0123270 A1 | 5/2007 | Casey | |
| 2007/0262855 A1 | 11/2007 | Zuta et al. | |
| 2007/0294030 A1 | 12/2007 | Jones | |
| 2008/0039988 A1 | 2/2008 | Estabrook et al. | |
| 2008/0091347 A1 | 4/2008 | Tashiro | |
| 2008/0252487 A1 | 10/2008 | McClellan et al. | |
| 2008/0312969 A1 | 12/2008 | Raines et al. | |
| 2009/0098907 A1* | 4/2009 | Huntzicker | G01C 21/12 455/556.1 |
| 2009/0309759 A1 | 12/2009 | Williams | |
| 2010/0073158 A1 | 3/2010 | Uesaka et al. | |
| 2010/0073201 A1 | 3/2010 | Holcomb et al. | |
| 2010/0106416 A1 | 4/2010 | Yochum | |
| 2010/0161209 A1 | 6/2010 | Vaghefinazari | |
| 2010/0185479 A1 | 7/2010 | Brinton et al. | |
| 2010/0238009 A1 | 9/2010 | Cook et al. | |
| 2011/0022263 A1 | 1/2011 | Sanchez-Prieto Aler et al. | |
| 2011/0060600 A1 | 3/2011 | Fox et al. | |
| 2011/0106370 A1 | 5/2011 | Duddle et al. | |
| 2011/0137508 A1 | 6/2011 | Garcia Manchado | |
| 2011/0196601 A1 | 8/2011 | Miura et al. | |
| 2011/0301806 A1 | 12/2011 | Messier et al. | |
| 2011/0313647 A1 | 12/2011 | Koebler et al. | |
| 2012/0078671 A1 | 3/2012 | Mohebbi et al. | |
| 2012/0092190 A1* | 4/2012 | Stefik | G06Q 10/02 340/932.2 |
| 2012/0095792 A1* | 4/2012 | Stefik | G06Q 10/02 705/5 |
| 2012/0173075 A1 | 7/2012 | Mays | |
| 2012/0191242 A1 | 7/2012 | Outwater | |
| 2012/0209634 A1 | 8/2012 | Ling et al. | |
| 2013/0006674 A1 | 1/2013 | Bowne et al. | |
| 2013/0122928 A1 | 5/2013 | Pfluger | |
| 2013/0151037 A1* | 6/2013 | Harumoto | B60H 1/00657 701/2 |
| 2013/0245880 A1 | 9/2013 | McQuade | |
| 2013/0317665 A1 | 11/2013 | Fernandes et al. | |
| 2013/0344856 A1 | 12/2013 | Silver et al. | |
| 2014/0028477 A1 | 1/2014 | Michalske | |
| 2014/0067246 A1 | 3/2014 | Eldredge et al. | |
| 2014/0085109 A1* | 3/2014 | Stefik | G06Q 10/02 340/932.2 |
| 2014/0176348 A1* | 6/2014 | Acker, Jr. | G08G 1/144 340/932.2 |
| 2014/0180727 A1 | 6/2014 | Freiberger et al. | |
| 2014/0236719 A1 | 8/2014 | Szostak | |
| 2014/0266594 A1 | 9/2014 | Reiser | |
| 2014/0309855 A1 | 10/2014 | Tran | |
| 2015/0019266 A1 | 1/2015 | Stempora | |
| 2015/0187013 A1 | 7/2015 | Adams et al. | |
| 2015/0187019 A1 | 7/2015 | Fernandes et al. | |
| 2015/0226563 A1 | 8/2015 | Cox et al. | |
| 2015/0228129 A1 | 8/2015 | Cox et al. | |
| 2016/0033291 A1 | 2/2016 | Inoue et al. | |

OTHER PUBLICATIONS

U.S. Appl. No. 14/842,753, filed Sep. 1, 2015, Cox et al.
U.S. Appl. No. 14/843,815, filed Sep. 2, 2015, Cox et al.
U.S. Appl. No. 14/843,853, filed Sep. 2, 2015, Cox et al.
Office action dated Apr. 23, 2015 for U.S. Appl. No. 14/177,188.
Office action dated Sep. 29, 2015 for U.S. Appl. No. 14/177,192.
Co-pending U.S. Appl. No. 15/476,549, filed Mar. 31, 2017.
Office Action dated Apr. 21, 2017 for U.S. Appl. No. 14/177,188.
Office Action dated May 10, 2017 for U.S. Appl. No. 14/177,192.
Office Action dated May 26, 2017 for U.S. Appl. No. 14/843,815.
Office Action dated Jan. 27, 2017 for U.S. Appl. No. 14/843,853.
Hemminki, et al. Accelerometer-Based Transportation Mode. SenSys '13 Proceedings of the 11th ACM Conference on Embedded Networked Sensor Systems. Article No. 13. 2013. 14 pages.
Office action dated Apr. 18, 2016 for U.S. Appl. No. 14/177,192.
Office action dated Jun. 7, 2016 for U.S. Appl. No. 14/843,853.
Office action dated Aug. 17, 2016 for U.S. Appl. No. 14/843,815.
Office action dated Sep. 12, 2016 for U.S. Appl. No. 14/177,188.
Office action dated Sep. 29, 2016 for U.S. Appl. No. 14/177,192.
Reddy, et al. Using mobile phones to determine transportation modes. ACM Trans. Sensor Netw. 6, 2, Article 13 (Feb. 2010), 27 pages. DOI:10.1145/1689239.1689243 http://doi.acm.org/10.1145/1689239.1689243.
Shoaib, et al. A Survey of Online Activity Recognition Using Mobile Phones. Sensors 2015, 15, 2059-2085; doi:10.3390/s150102059.
Stenneth, et al. Transportation Mode Detection using Mobile Phones and GIS Information. ACM SIGSPATIAL GIS '11, Nov. 1-4, 2011. Chicago, IL, USA. 54-63.
Notice of Allowance dated Aug. 15, 2017 for U.S. Appl. No. 14/843,853.
Office Action dated Sep. 14, 2017 for U.S. Appl. No. 14/842,753.

* cited by examiner

SYSTEMS AND METHODS FOR DETERMINING PARKING INFORMATION FOR A VEHICLE USING VEHICLE DATA AND EXTERNAL PARKING DATA

CROSS-REFERENCE

This application claims the benefit of U.S. Provisional Application No. 62/044,970, filed Sep. 2, 2014, which is entirely incorporated herein by reference.

BACKGROUND

Parking is the act of stopping and disengaging a vehicle and leaving it unoccupied. A vehicle may be parked in a building or on a road. Some buildings have parking facilities for use of the buildings' users.

In parking a vehicle, a user typically finds an available location on a road or a parking structure, for example, and maneuvers the vehicle to the available location. The user may then turn off the vehicle and leave the available location.

Vehicles increasingly rely on computers and sensors for a variety of purposes. With time, the information determined from a vehicle gets more sophisticated, and more comprehensive about a variety of aspects relating to the operation of a vehicle.

SUMMARY

Recognized herein are various issues with parking vehicles. For example, upon parking a vehicle and leaving a vehicle parking location, a user may not accurately remember the vehicle parking location, making it difficult to find the vehicle at a later point in time.

The present disclosure provides methods and systems for determining parking information for a vehicle. Such parking information can be determined using vehicle data and external parking data.

An aspect of the present disclosure provides a computer-implemented method for providing parking information, comprising (a) obtaining vehicle data from a vehicle and/or a mobile computing device of a user; (b) determining, using one or more programmed computer processors, whether the vehicle is parked from the vehicle data; (c) determining, using the one or more programmed computer processors, a parking location of the vehicle from the vehicle data; (d) determining information about the parking location; and (e) outputting the information about the parking location to the user. In some embodiments, (a) comprises obtaining vehicle data from a vehicle and the mobile computing device of the user.

In some embodiments, the vehicle data includes Global Positioning System (GPS) data. In some embodiments, the vehicle data includes sensor data. In some embodiments, determining information about the parking location includes determining one or more rules or parameters about the parking location. In some embodiments, determining the parking location includes determining a sub-region or parking space of the vehicle within a parking lot or garage based on the vehicle data. In some embodiments, determining the parking location includes determining a side of a street or an orientation of the vehicle when parked from the vehicle data.

In some embodiments, the vehicle data is used to determine that the vehicle is towed. In some embodiments, the vehicle data includes sensor data.

In some embodiments, user feedback is used to improve the determination of whether the vehicle is parked, where the vehicle is parked, and/or information about the parking location. In some embodiments, user feedback includes labeling the side-of-street, orientation, location of parking, and/or providing information on legality and timing of parking from street signs.

In some embodiments, the information about the parking location is outputted on a user interface of the mobile computing device of the user or another mobile computer device. In some embodiments, the information about the parking location is determined using a database with historical parking records.

In some embodiments, input is received from the user about whether the parking location is correct or not correct. In some embodiments, the input is received from the mobile computing device of the user.

In another aspect, a system for determining or providing parking information comprises one or more computer processors that are individually or collectively programmed to implement any of the methods above or elsewhere herein. In some embodiments, a system for providing parking information comprises a communications interface that is in communication over a network with a vehicle and/or mobile computer device of a user; and one or more computer processor operatively coupled to the communications interface, wherein the one or more computer processors are individually or collectively programmed to (i) obtain vehicle data from the vehicle and/or a mobile computing device of the user over the network, (ii) determine whether the vehicle is parked from the vehicle data, (iii) determine a parking location of the vehicle from the vehicle data, (iv) determine information about the parking location, and (v) output the information about the parking location to the user.

In some embodiments, the computer processor is programmed to determine the parking location by determining a sub-region or parking space of the vehicle within a parking lot or garage based on the vehicle data. In some embodiments, the computer processor is programmed to receive and employ user feedback to improve the determination of whether the vehicle is parked, where the vehicle is parked, and/or information about the parking location. In some embodiments, the computer processor is programmed to receive input from the user about whether the parking location is correct or not correct, which input is received from the mobile computing device of the user over the network.

In another aspect, a non-transitory computer readable medium comprises machine executable code that, upon execution by one or more computer processors, implements any of the methods above or elsewhere herein. In some embodiments, a non-transitory computer-readable medium comprises machine executable code that, upon execution by one or more computer processors, implements a method for providing parking information, the method comprising (a) obtaining vehicle data from a vehicle and/or a mobile computing device of a user; (b) determining whether the vehicle is parked from the vehicle data; (c) determining a parking location of the vehicle from the vehicle data; (d) determining information about the parking location; and (e) outputting the information about the parking location to the user.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

DETAILED DESCRIPTION

Figure 1:
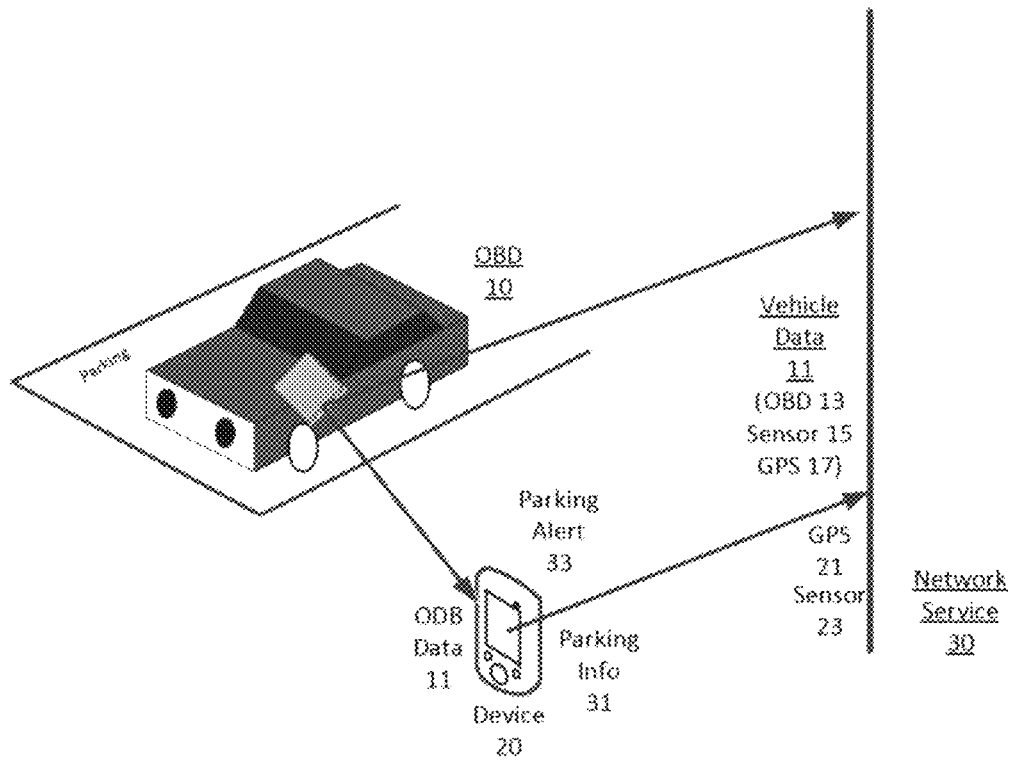
FIG. 1 illustrates a parking monitoring system for vehicles, according to some embodiments.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Examples described herein utilize a vehicle interface (or monitor) device that obtains various kinds of information from a vehicle that is being driven in order to determine parking information for the vehicle. Among other information, global positioning system (GPS) and/or other sensor information (e.g., WiFi data) can be used to locate a vehicle in a specific parking location, and further provide information about the parking location (e.g., times when legal, metered or not, permit required, etc.). GPS and/or other sensor information can be used to determine a geographic location (geolocation) of the vehicle. Vehicle information may be determined telematically using, for example, a combination of geolocation information (e.g., GPS information) and an electronic device (e.g., mobile computing device) in the vehicle. The parking location can include street parking, or a spot in a parking lot or garage. As an addition or alternative, examples described herein use vehicle data to determine when a vehicle is being towed or impermissibly driven from a parking space (e.g., stolen).

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or software or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through instructions that are executable by one or more processors. These instructions may be carried on a computer-readable medium. Machines shown or described with figures below provide examples of processing resources and computer-readable mediums on which instructions for implementing embodiments of the present disclosure can be carried and/or executed. In particular, the numerous machines shown with embodiments of the present disclosure include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, embodiments may be implemented in the form of computer programs, or a computer usable carrier medium capable of carrying such a program.

FIG. 1 illustrates a parking monitoring system for vehicles, according to one or more embodiments. A parking monitoring system such as described with FIG. 1 can be implemented in order to provide drivers with a service that informs the individual drivers about a parking space of their vehicle. The information can include parking rules, costs, and incident history, which can assist the driver in, for example, tracking the cost of the parking space in real-time (e.g., if metered parking), avoid incidents where the vehicle may be towed or fined (e.g., time limit on parking, street cleaning), and provide information to the user regarding risk of vandalism or theft. Additionally, the information can assist the driver to re-locate a parked car.

In one embodiment, a parking monitoring system includes an onboard device 10, a mobile (or portable) computing device 20, and a network service 30. The onboard device 10 includes an interface with internal components of the vehicle in order to obtain On-Board Diagnostic ("OBD") data, such as OBD-II data. Additionally, the onboard device 10 can include additional devices and components, such as a GPS component, wireless receiver (e.g., WiFi receiver), as well as sensors such as one or more accelerometer(s) or gyroscope(s). This can be implemented in a manner such as shown and described in U.S. Patent Publication Nos. 2015/0226563 and 2015/0228129, each of which is entirely incorporated herein by reference. The wireless receiver may be used to determine a location of the vehicle via wireless triangulation, for example. The onboard device 10 can communicate vehicle data 11 to the mobile computing device 20, which in turn communicates the vehicle data 11 to the network service 30. The vehicle data 11 can include OBD data 13, sensor information 15 from independent sensors resident on the onboard device 10 (e.g., accelerometer information, gyroscope information, magnetometer information, etc.) and/or GPS data 17 (from an independent GPS component resident on the onboard device 10).

In one implementation, the mobile computing device 20 includes software and programming to receive the vehicle data 11, and further to restructure, modify or augment the vehicle data 11 for transmission to the network service 30. For example, the mobile computing device 20 can encrypt the vehicle data 11, or include account information so that the network service 30 associates the vehicle data 11 with a particular user. In a variation, the onboard device 10 communicates directly with the network service 30.

In a variation, the mobile computing device 20 can obtain independent sensor and position information using sensors and GPS resources (or other location aware resources) resident on the device 20. In particular, the mobile computing device 20 can generate GPS data 21, and magnetometer and accelerometer information as sensor information 23, based on information sensed on the mobile computing device when the vehicle is in motion (e.g., prior to the vehicle stopping and parking) and after the vehicle has stopped. The accelerometer information 23 and GPS information (or other geolocation information) 21 can be communicated to the network service 30 continuously, or in response to a parking trigger.

The network service 30 can obtain information from the vehicle when it is in motion, and also when the vehicle 10 stops and turns off. In examples of FIG. 1, the sources of the information include the onboard device 10 and/or the mobile computing device 20. From the information, the network service 30 determines parking information 31 and parking alerts 33 for the vehicle 10.

In one implementation, the parking information 31 and parking alerts 33 are communicated to a computing device associated with the vehicle, such as the mobile computing device 20 or alternatively, an onboard computer provided with the vehicle 10. As described with examples, the determined parking information 31 can include a classification of the parking spot, a pinpoint location of the parking spot (e.g., on street or in parking garage), rules pertaining to the parking spot, and other information. The parking alerts 33 can include notifications which are based on the parking information 31 and communicated to the mobile computing device 20.

In one embodiment, the network service 30 uses vehicle data 11 that is originally obtained from the onboard device 10, which can include (i) an interface for obtaining the OBD data and (ii) independent sensor information from components resident on the onboard device 10. This data can be communicated in whole or in part from the onboard device 10. Alternatively, the vehicle data 11 can be processed by the mobile computing device 20 so that the device 20 serves as a modem proxy for the onboard device 10.

Still further, in another embodiment, an example system includes the mobile computing device 20 and the network service 30. The network service 30 utilizes GPS and sensor information 21, 23 originating from the mobile computing device 20. For example, the accelerometer and GPS components of the mobile computing device can measure acceleration and determine position while the mobile computing device 20 is inside the vehicle 10, both before and after when the vehicle is parked. In one implementation, the mobile computing device 20 can run an application in the background that records GPS information and accelerometer information, and then transfers this information to the network service 30 when a parking trigger occurs (e.g., user provides input that vehicle is parked, or mobile computing device 20 detects that parking has occurred using sensor and GPS data).

Thus, in some embodiments, the onboard device 10 is optional, and network service 30 generates parking information 31 and/or parking alerts 33 using GPS and sensor data 21, 23 originating from the mobile computing device 20 (which is present in the vehicle before and immediately after when the vehicle is parked). Still further, in other variations, the computing device that receives the parking information does not have to be located on the vehicle or the person operating the vehicle. Thus, alternative variations provide for network service 30 to receive onboard device data 11. The onboard device data 11 can include OBD data 13, as well as sensor data 15 and GPS data 17 from independent sensors of the onboard device 10.

As sill another variation, the mobile computing device 20 can perform the operations of determining GPS and sensor information 21, 23, and then implementing programmatic processes to determine parking information 31 and alerts 33. In such a variation, the mobile computing device 20 can operate as a client-based system that operates independently, without use of the onboard device 10 or dedicated network service 30.

The mobile computing device 20 can include a user interface, such as a graphical user interface (GUI). The user interface can present information to a user, such as, for example, parking information 31. The user interface can be a passive display or an active touch display (e.g., a capacitive or resistive touch screen).

Vehicle data may be obtained by one or more sensor on (or onboard) a vehicle. The one or more sensor may be part of the vehicle. As an alternative or in addition to, the vehicle data may be obtained by one or more sensor external to the vehicle or in the vehicle but not part of or removable from the vehicle (e.g., mobile electronic device of a user).

Figure 2:
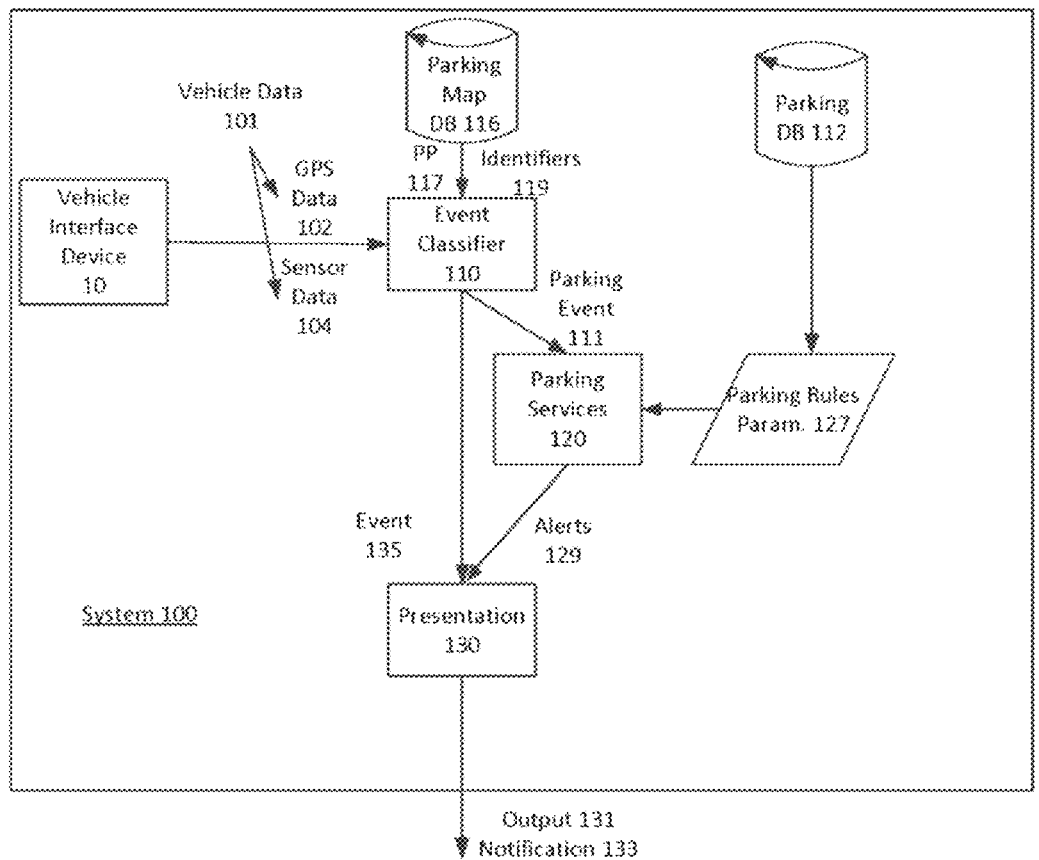
FIG. 2 illustrates a system for determining parking information for a vehicle using vehicle data and parking data.

With reference to FIG. 2, a system 100 performs operations to monitor vehicle usage, and more specifically, to detect parking events for the purpose of further monitoring and providing parking information related services. In monitoring parking events, the system 100 can utilize parking data, such as from a parking database 112 that can provide parking relevant information for a user. The parking data can be provided by an external parking database. As an alternative or in addition to, the parking data can be provided by an internal database, such as an internal database with historical parking records (e.g., parking citations or tickets, theft, property damage, etc.). A parking restriction or availability schedule may be inferred from such parking data. For example, theft risk may be determined from historical crime records at or in proximity to a parking location, and an indication of elevated risk of theft may be relayed to the user, including times the user may avoid parking at the parking location.

In an implementation, system 100 can be implemented in part or in whole as a network service. As a variation, the system 100 can be implemented as a client system (e.g., on a mobile device, such as mobile cellular telephony device or tablet), or alternatively, as a shared platform or functionality between a client and network service.

According to one or more embodiments, system 100 includes an event classifier 110, a parking database 112 and parking services 120. In one implementation, the event classifier 110 receives vehicle data 101 from a device that is resident within the vehicle before and just after the vehicle is parked. The vehicle data 101 can include position information (e.g., from GPS) and sensor information (accelerometer information, magnetometer, gyroscope data). In one implementation, the vehicle data 101 used by the event classifier 110 includes GPS data 102 and sensor data 104. The sensor data 104 can correspond to data from one or more sensors provided on the vehicle interface device 10, including one or more sensors corresponding to an accelerometer, gyroscope, RPM, battery voltage (and other sensors that tell us whether the car is on), altimeter, magnetometer, and intake air temperature (outside or inside). In one implementation, the vehicle interface device 10 can wirelessly communicate vehicle data 101 to system 100. Alternatively, data from the vehicle interface device 10 can be communicated to the event classifier through an intermediate mobile computing device, such as shown by another example of FIG. 1.

In another embodiment, the vehicle data 101 can be provided in whole or in part by the mobile computing device 20, which can be resident with the vehicle. In such a variation, the vehicle data 101 includes accelerometer data and GPS data, both of which can be generated by internal resources of the mobile computing device 20 residing in the vehicle when the parking event takes place.

The event classifier 110 receives vehicle data 101, and uses the vehicle data 101 to detect and classify parking events 111. The parking event 111 can include (i) an occurrence of the vehicle being detected as being parked, and (ii) a location of the vehicle where it is parked. Additionally, the parking event can include events that occur after the vehicle is parked. As described below, the detection of parking events can be used to provide parking information related services, such as providing information to the driver regarding (i) restrictions on a given parking location (e.g., parking is paid, parking has time restrictions such as for street sweeping, etc.), and/or (ii) cost to the driver for parking at a particular location.

In addition, parking events can include detecting an event after the vehicle is parked, including (i) instances when the vehicle is being driven permissively (e.g., by owner) from a parking location, (ii) instances when the vehicle is being driven without permission (e.g., vehicle is stolen) from a parked location, and (iii) instances when the vehicle is being towed from the parked location.

In detecting the parking event, the event classifier 110 can detect the occurrence of a parking event when the vehicle is turned off. The sensor data 104 can be used to determine when the vehicle is off. For example, an ignition off event can be communicated from OBD data, detected through the vehicle interface device 10. As an alternative or addition, sensor data 104, such as provided by the accelerometer and/or gyroscope of the vehicle interface device 10 can be used to detect the car is still for more than a threshold duration (e.g., to be indicative of the parking event). When the vehicle is detected as being parked, the event classifier 110 can determine the location of the vehicle from GPS data 102. Additionally, other information about the orientation of the vehicle can be determined from the sensor data 104. For example, sensor data 104 provided by an altimeter of the vehicle interface device 10 can be used to determine the height of the vehicle relative to, for example, street level. This information can be used to further locate the location of the vehicle in a parking garage. Still further, sensor data 104 provided by a magnetometer can be used to determine the directional orientation of the vehicle, such as the direction that the vehicle is facing. As another variation, sensor data 104 provided by an accelerometer can be used to determine if the vehicle is at a tilt, coinciding with, for example, the vehicle being parked on a hill. In this way, GPS data (location) can be used with sensor data 104 (e.g., altitude, orientation, tilt) to detect, for example, the side of the street a vehicle is parked, the particular parking spot the vehicle occupies in a lot, and/or the floor of a parking garage where the vehicle resides.

In one implementation, the parking event 111 is communicated to the parking service 120. The parking event 111 can specify the location of the vehicle when the event occurred. In particular, the parking event can pinpoint the vehicle's location as determined by GPS, as well as more precise information such as the specific location of the vehicle in a parking lot (e.g., north quadrant, specific row or column in parking lot, parking space number, particular street side) or in a parking garage (e.g., the specific floor where the vehicle is parked).

In one implementation, the event classifier 110 uses a parking map database 116 to determine a pinpoint parking location 117 of the vehicle. The pinpoint parking location 117 can be communicated to the parking service 120 as part of the parking event 111. The parking map database 116 can generate space or region identifiers 119, corresponding to one or multiple parking spaces or parking regions associated with a particular location (as identified by GPS data 102). The individual parking spaces or regions can be identified by sub-location (e.g., direction at address), orientation, elevation and other characteristics. The event classifier 110 uses the vehicle data 101 in order to further pinpoint the location of the vehicle. In particular, the event classifier 110 can use sensor information, such as provided by magnetometer, altimeter, or other sensor, in order to pinpoint the parking space used at a particular location. In this way, the event classifier 110 can determine the pinpoint parking location 117 associated with a particular GPS location, such as the parking spaces in a lot or garage.

The parking service 120 operates to classify the pinpoint parking location 117 where the vehicle is determined to be parked based at least in part on the location of the vehicle. In this way, the parking service 120 can classify the parking event 111 based on location provided by the GPS, as well as other information that pinpoints the vehicle within a particular parking area.

In classifying the parking event 111, the parking service 120 uses the parking database 112. The parking database 112 can correspond to an aggregation of parking rules and parameters 127 that are cross-referenced to specific parking locations (which can be identified by the parking map database 116). In one implementation, the parking services 120 uses the parking rules and parameters 127 to classify the pinpoint parking location 117 of the vehicle. The classifiers can include, for example, a designation of home, street parking, garage parking, or parking lot. In variations, the street parking can further be classified as permit parking, non-parking, and metered/non-metered classifiers. Still further, the classifiers can be classified as (i) time restricted, (ii) paid or unpaid, (iii) illegal (e.g., parking in red-zone or tow-away) or legal, and/or (iv) parking on permitted (e.g., parking lot or garage) or non-permitted private parking area (e.g., parking in space reserved for private business). For example, garage or lot parking can be classified by free or paid parking classifiers. As another addition or alternative, time restricted classifiers can correspond to parking spots that are forbidden for use during certain time periods (e.g., parking illegal at night because of street sweeping). Still further, the classifier for the parking spot can reflect a crime level of the parking spot. For example, the classifier can reflect that the selected street parking is "safe", "moderate" or "heavy" in regards to the number of incidents of vehicle theft or vandalism. In order to provide the classification as to crime, the parking database 112 can interface with, for example, local police records which identify criminal/vandalism incidents per neighborhood or location.

In this way, the parking service 120 can reference the pinpoint parking location 117 of the vehicle to parking rules and parameters 127 that are specific to that location. The pinpoint parking location 117 can be classified as to, for example, time restrictions (parking illegal between specific times) or metered/non-metered. In one implementation, the parking service 120 can use the classifier as determined for the individual parking location to provide class-specific information to the user. This information can include, for example, information that informs the user of the classification of the parking event (e.g., parking in metered or time-restricted parking space, parking illegally or on private property where parking is tow-away).

The presentation component 130 can communicate with the parking services 120 in order to output information and notifications relating to parking events of the user. The output 131 provided by the presentation component 130 includes one or more of (i) a summary of the parking event (e.g., classifier of the parking spot selected by the user), (ii) information relating to rules or parameters of the parking location selected by the user (e.g., time restrictions, times when the parking spot becomes a no-parking zone, permit required for street parking), and/or (iii) cost or time tally (e.g., how long the user has been in the parking location, how much the parking bill is when hourly parking). The output 131 can be provided immediately after the user parks a vehicle.

As another alternative or addition, the output 131 can be provided to the user as historical information. For example, the user can select to view a summary of his or her parking events over the course of a duration (e.g., past week).

The presentation component 130 can communicate the output 131 to an application executing on a user device, such as a mobile telephony computing device or tablet.

As an alternative or addition, the parking service 120 can generate alerts 129, which can be communicated as notifications 133 from the presentation component 130. The parking service 120 can generate the alerts 129 in response to a condition determined from the parking rules and parameters 127. By way of example, the alerts 129 can identify when, for example, a selected parking spot of a user transitions from being legal to being illegal (e.g., parking spot time limit exceeded, street parking time becomes illegal because of street cleaning, etc.).

In one implementation, the notifications 133 can be signaled to the user through an application that interfaces with the system 100. In a variation, the notifications 133 can be signaled through a messaging application, such as a through a Short Message Service ("SMS") or email application.

According to some embodiments, the event classifier 110 can also detect post-parking events 135, such as when the car is driven from the parking spot. In one implementation, the post-parking events 135 can signal a notification (e.g., application notification, messaging notification, etc.) when vehicle is moved. As an addition or alternative, the event 135 can correlate to an instance when the vehicle is moved without the driver. For example, the event classifier 110 can detect when the vehicle is moved from a parking spot, and further location the mobile computing device of the driver. If the driver is not determined to be within the vehicle, the event classifier 110 can detect a potential threat of the vehicle being stolen. Still further, the classifier 110 can detect when the vehicle is moved, and further use sensor information to determine the vehicle is likely being towed. For example, the sensor information 104 can correspond to accelerometer or gyroscope data, which indicates whether the vehicle is being moved at a tilt or angle that is indicative of the vehicle being towed. The events 135 can be communicated to the presentation component 130, which signals notifications 133 or other communications to the end user.

Methods

Figure 3A:
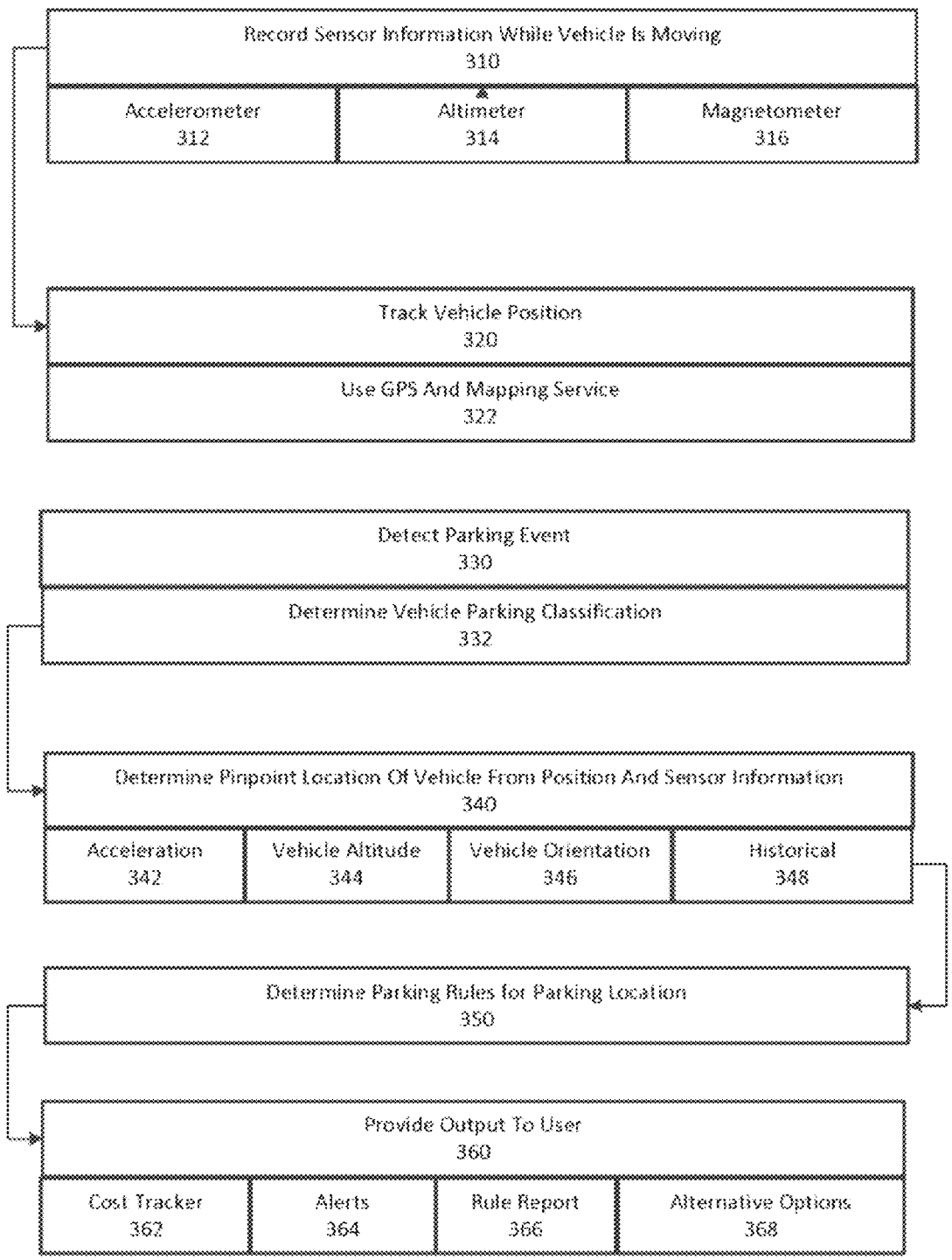
FIG. 3A illustrates an example method for detecting and analyzing a parking event.
Figure 3B:
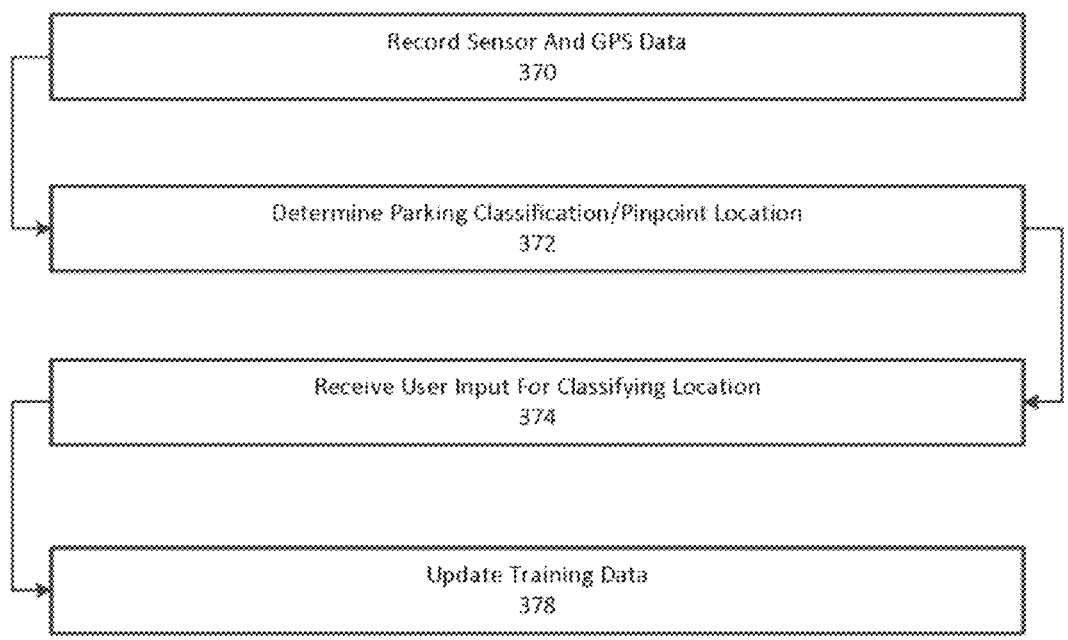
FIG. 3B illustrates an example method for enhancing a service for detecting and analyzing a parking event.

FIG. 3A illustrates an example method for detecting and analyzing a parking event. FIG. 3B illustrates an example method for enhancing a service for detecting and analyzing a parking event. An example method such as described with FIG. 3A and FIG. 3B can be implemented using components such as described with examples of FIG. 1 or FIG. 2. Accordingly, in describing an example method of FIG. 3A or FIG. 3B, reference may be made to elements of FIG. 1 or FIG. 2 for purpose of illustrating a suitable component for performing a step or sub-step being described.

With reference to an example of FIG. 3A, sensor information is recorded from within the vehicle (310). In one implementation, the sensor information is recorded from onboard device 10. In a variation, the sensor information is recorded from a mobile computing device. Still further, in one implementation, the sensor information can be continuously recorded for a designated duration of time (e.g., 5 minutes), so that when a parking event is detected, sensor information is available for a duration that preceded the event. The sensor information can be recorded locally on the vehicle and then transmitted to, for example, the network service 30 either on an as-needed basis (e.g., after when the parking event is detected) or continuously.

The sensor information can include accelerometer data (312). In one implementation, the accelerometer data is obtained from a sensor that is calibrated to detect both forward and backward acceleration and lateral acceleration (coinciding with turning). Still further, in some variations, the accelerometer can also record vertical acceleration.

In some variations, the sensor information can be provided from different kinds of sensors, including an altimeter (314) and/or magnetometer (316). Still further, other kinds of sensors such as a gyroscope can also be used to determine the sensor information.

In addition to recording the sensor information, the vehicle position can also be tracked (320). For example, a mobile computing device residing within the vehicle can track its position until the parking event occurs. Alternatively, a GPS component resident with another device within the vehicle, such as with the onboard device 10, can record the position information. The GPS information can be referenced against a mapping service in order to determine an approximate position of the vehicle within a street (322). In one implementation, the location of the vehicle can be tracked and transmitted continuously to the network service 30 by the onboard device 10 or by the mobile computing device 20 (depending on implementation). In a variation, the location of the vehicle is tracked locally using either an onboard device 10 or the mobile computing device 20. The location can be transmitted to the network service 30 periodically or on an as-needed basis.

A parking event is detected when the vehicle is parked (330). In one implementation, the parking event coincides with the driver providing input to, for example, the mobile computing device 20 indicating that the vehicle has been parked and/or a location whether the vehicle has been parked. In another implementation, the parking event can be detected when the onboard device 10 detects that the vehicle has been shut off. Depending on the implementation, the network service 30 can receive a communication from the either the onboard device 10 or the mobile computing device 20, indicating the parking event occurred (e.g., user input or data indicating the vehicle is shut-off).

With detection of the parking event, the parking classification of the vehicle can be determined (332). For example, the GPS information can locate the vehicle and determine whether the vehicle is within a garage or on the street.

According to one aspect, a pinpoint position of the vehicle is determined using the recorded position and sensor information from the vehicle (340). If the parking classification coincides with a parking garage, the pinpoint parking location can identify the location of the vehicle to, for example, a quadrant, floor, section, or specific parking space.

In one embodiment, the pinpoint position of the vehicle is determined by the event classifier 110 at least in part using the accelerometer information (342). The accelerometer information can indicate where a vehicle stopped or slowed down. Additionally, the accelerometer information can originate from a sensor that is calibrated to detect lateral movement such as turns. In such an implementation, the accelerometer information can be used to detect where and when the user parallel parks or otherwise street parks. In one implementation, certain accelerometer profiles can be fingerprints of a lateral parking event. For example, sensor data can indicate that (i) the vehicle turned without changing streets, and/or (ii) the vehicle went forward and backward a short distance (perhaps more than once) before or during turning on a street. The event classifier 110, for example, can obtain such accelerometer profiles in order to programmatically detect that a user street parked and/or parallel parked the vehicle.

As an addition or alternative, other sensor information can be used by the event classifier 110 to determine other parking scenarios (344). For example, an altimeter reading taken from the vehicle before the parking event occurred can indicate the height of the vehicle relative to sea-level. If the vehicle is detected as being in a garage, the altimeter information can be used to determine the floor of the garage that the user is on.

As another example, the sensor information can provide data that indicates the orientation of the vehicle (346). Specifically, data from a magnetometer can determine the direction, for example, that a vehicle is facing (e.g., north, south, etc.). Such information can be referenced with, for example, a parking map that shows the position and orientation of individual spots (e.g., within a map). The orientation of the vehicle can further provide data that is indicative of a specific section (e.g., north facing wall) or spot (e.g., parking space). The event classifier 110, for example, can reference the approximate location of the vehicle and its relative orientation to a small set of parking spaces in a parking lot of area that have the same location and orientation.

As an addition or alternative, other sources of information can be used to determine data that is indicative of the vehicle's parking position. In one implementation, historical information can be used to further weight or otherwise generate the determination of the parking location (348). For example, a driver may have a favorite parking spot, and when the sensor information indicates the vehicle's proximity to the favorite spot, the determination can be made that the vehicle is parked in that location.

When the pinpoint parking location is determined for the parked vehicle, the parking rules and parameters can be identified for the parking space (350). For example, the parking service 120 can use the pinpoint location to determine rules and parameters such as (i) rate for parking spot, (ii) how long the user can park in the spot (e.g., metered), (iii) when the user may be fined or towed (e.g., parking in street during street cleaning), and/or (iv) when parking is not permitted.

Based on the determined rules and parameters, an output can be generated and communicated to the user (360). For example, with reference to an example of FIG. 1, the network service 130 can generate an output for the mobile computing device 20, which can be carried by the driver of the vehicle after parking the vehicle. With reference to an example of FIG. 2, the presentation component 30 can generate an output for a computing device of the user.

By way of example, the output can include cost tracking, which can, for example, determine the minute or hourly rate for a particular parking space within a lot or garage (362). Cost tracking can track the time from the parking event and implement the rate for the detected parking location in order to obtain an ongoing parking rate, which can be displayed (e.g., continuously) on the mobile computing device 20.

As another example, the output provided to the user can include an alert (364). For example, network service 30 can send a messaging notification (e.g., Short Message Service) or application alert to the mobile computing device 20 of the user, in order to convey time-sensitive information about the user's parked car (e.g., meter running out of time, parking duration of time exceeded, street sweeping hours initiated, etc.).

As still another variation, the output provided to the driver of the vehicle can include a rule summary for the estimated parking location of the vehicle (366). The rule summary can indicate, for example, the parking rate (e.g., hourly rate), and conditions or rules relating to the availability of the selected parking space (e.g., no night parking). The rule summary can be provided at any time, such as just after the vehicle is parked.

Still further, the output provided to the driver of the vehicle can include alternative options (368). For example, the network service 30 can identify other parking lots with cheaper rates or better hours, the location of nearby street parking, the location of nearby street parking that is not metered (or metered at a lower rate), or the location of other parking spaces that are safer. In one implementation, the determination of alternative parking spaces can be made by a programmatic component that uses the determined location of the parking event as criteria in searching the parking database 112 for close parking resources provided with better rates, more favorable rules, safer conditions etc. The identified results of the search can then be communicated to the computing device of the user.

With reference to FIG. 3B, data is recorded for determining the parking location and classification of the parked vehicle. For example, as described with an example of FIG. 3A, the recorded data includes sensor information and GPS information (370). The data can be recorded locally on the vehicle using, for example, the mobile computing device 20 of the driver and/or the onboard device 10. Using the recorded data, the parking classification and/or pinpoint location can be determined (372) by system 100.

According to an embodiment, user input (or feedback) is received regarding the parking classification and/or parking location (374). In one implementation, the user is provided an interface on the mobile computing device 20 to enter input as to the location of the vehicle. As another variation, the determined classification of the user's parking is displayed to the user on the mobile computing device 20. The user can then provide input that indicates whether the determined classification is correct or not correct. In some variations, the user can also provide input that corrects the determination.

Based on the input provided by the user, a set of training data is updated for training the event classifier 110 (378). With updated training data and feedback, the network service 130 is better able to tune the event classifier 110, and further to pair a profile or fingerprint of the recorded sensor/location information with a particular classification or parking location.

Computer Systems

Figure 4:
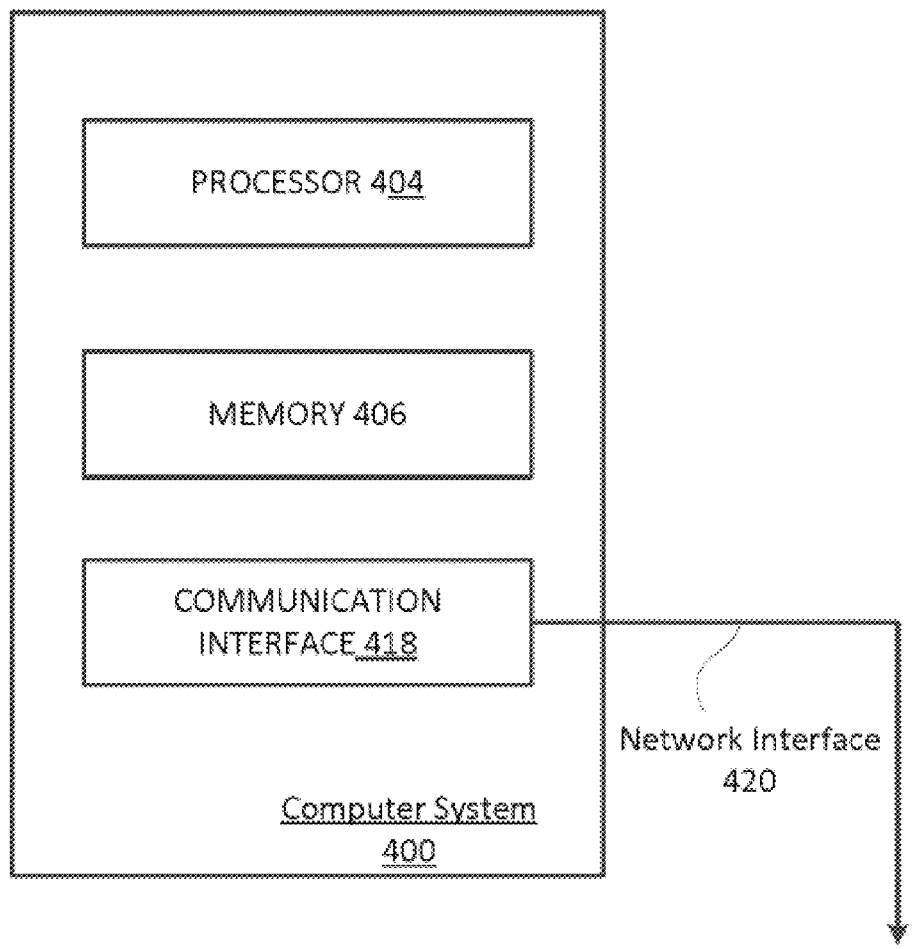
FIG. 4 illustrates a computer system on which some embodiments may be implemented.

FIG. 4 is a block diagram that illustrates a computer system 400 upon which embodiments described herein may be implemented. For example, a system such as described with FIG. 2 can be implemented on a computer system such as described with an example of FIG. 2. Likewise, a method such as described with an example of FIG. 3A and FIG. 3B can also be implemented using a computing system such as described with FIG. 4.

In an embodiment, computer system 400 includes processor 404, memory 406 (including non-transitory memory), storage device, and communication interface 418. The memory 406 can include random access memory (RAM) or other dynamic storage resources, for storing information and instructions to be executed by processor 404. The memory 406 also may be used for storing temporary variables or other intermediate information during execution of instructions to be executed by processor 404. The memory 406 may also include a read only memory (ROM) or other static storage device for storing static information and instructions for processor 404. A storage device 410, such as a magnetic disk or optical disk, is provided for storing information and instructions. The communication interface 418 may enable the computer system 400 to communicate with one or more networks through use of the network link 420 (wireless or wireline).

In one implementation, memory 406 may store instructions for implementing functionality such as described with an example of FIG. 2, or implemented through an example method such as described with FIG. 3A or FIG. 3B. Likewise, the processor 404 may execute the instructions in providing functionality as described with a system such as described with FIG. 2, or with an example method such as described with FIG. 3A or FIG. 3B.

Embodiments described herein are related to the use of computer system 400 for implementing the techniques described herein. According to one embodiment, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement embodiments described herein. Thus, embodiments described are not limited to any specific combination of hardware circuitry and software.

Figure 5:
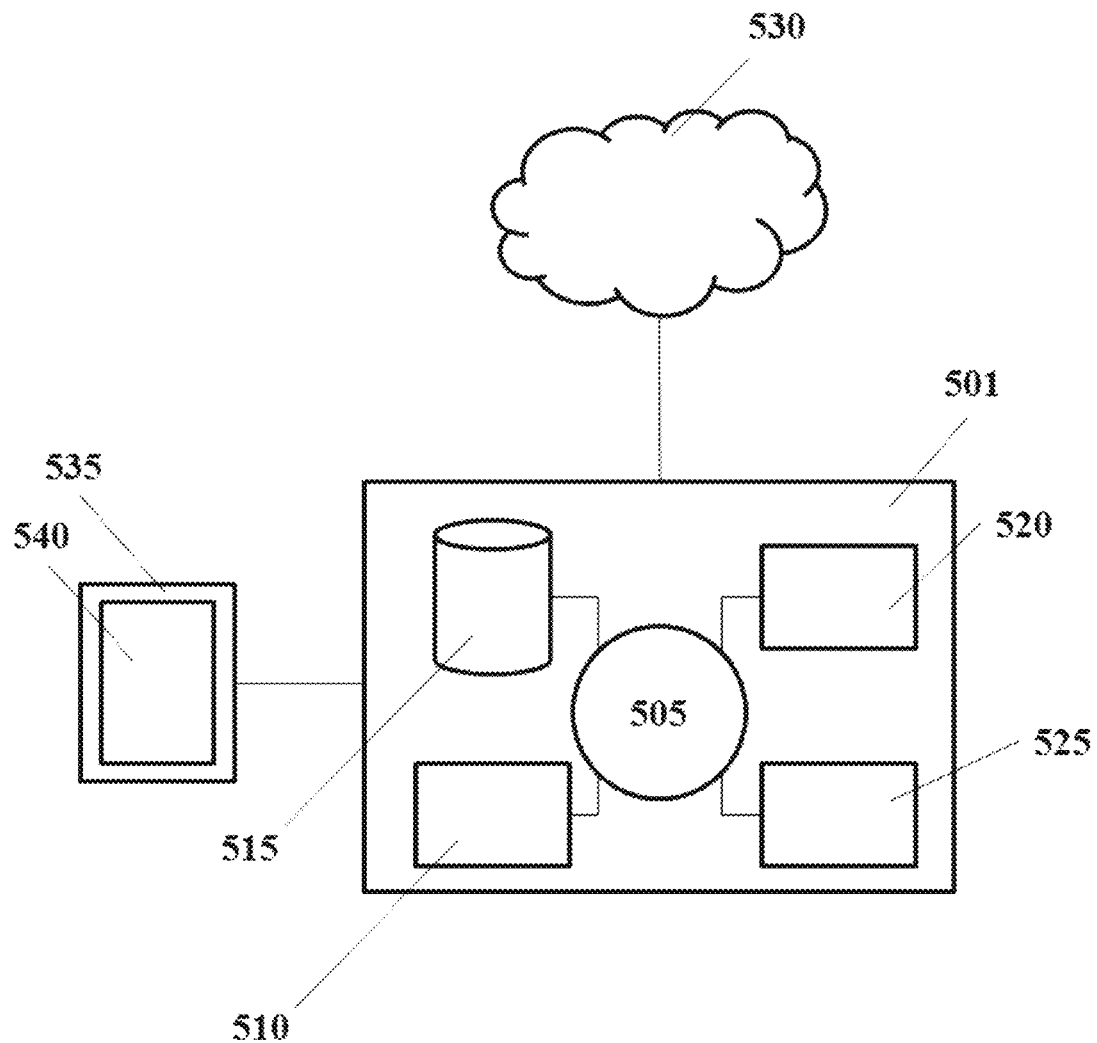
FIG. 5 schematically illustrates a computer system that is programmed or otherwise configured to implement methods of the present disclosure.

FIG. 5 shows another computer system 501 that is programmed or otherwise configured to implement methods and systems of the present disclosure, such as determining and providing parking information. The computer system 501 can regulate various aspects of methods and systems of the present disclosure. The computer system 501 can be a computer server.

The computer system 501 includes a central processing unit (CPU, also "processor" and "computer processor" herein) 505, which can be a single core or multi core processor, or a plurality of processors for parallel processing. The computer system 501 also includes memory or memory location 510 (e.g., random-access memory, read-only memory, flash memory), electronic storage unit 515 (e.g., hard disk), communication interface 520 (e.g., network adapter) for communicating with one or more other systems, and peripheral devices 525, such as cache, other memory, data storage and/or electronic display adapters. The memory 510, storage unit 515, interface 520 and peripheral devices 525 are in communication with the CPU 505 through a communication bus (solid lines), such as a motherboard. The storage unit 515 can be a data storage unit (or data repository) for storing data. The computer system 501 can be operatively coupled to a computer network ("network") 530 with the aid of the communication interface 520. The network 530 can be the Internet, an internet and/or extranet, or an intranet and/or extranet that is in communication with the Internet. The network 530 in some cases is a telecommunication and/or data network. The network 530 can include one or more computer servers, which can enable distributed computing, such as cloud computing. The network 530, in some cases with the aid of the computer system 501, can implement a peer-to-peer network, which may enable devices coupled to the computer system 501 to behave as a client or a server.

The CPU 505 can execute a sequence of machine-readable instructions, which can be embodied in a program or software. The instructions may be stored in a memory location, such as the memory 510. The instructions can be directed to the CPU 505, which can subsequently program or otherwise configure the CPU 505 to implement methods of the present disclosure. Examples of operations performed by the CPU 505 can include fetch, decode, execute, and writeback.

The CPU 505 can be part of a circuit, such as an integrated circuit. One or more other components of the system 501 can be included in the circuit. In some cases, the circuit is an application specific integrated circuit (ASIC).

The storage unit 515 can store files, such as drivers, libraries and saved programs. The storage unit 515 can store user data, e.g., user preferences and user programs. The computer system 501 in some cases can include one or more additional data storage units that are external to the computer system 501, such as located on a remote server that is in communication with the computer system 501 through an intranet or the Internet.

The computer system 501 can communicate with one or more remote computer systems through the network 530. For instance, the computer system 501 can communicate with a remote computer system of a user (e.g., operator or passenger of a vehicle). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 501 via the network 530.

Methods as described herein can be implemented by way of machine (e.g., computer processor) executable code stored on an electronic storage location of the computer system 501, such as, for example, on the memory 510 or electronic storage unit 515. The machine executable or machine readable code can be provided in the form of software. During use, the code can be executed by the processor 505. In some cases, the code can be retrieved from the storage unit 515 and stored on the memory 510 for ready access by the processor 505. In some situations, the electronic storage unit 515 can be precluded, and machine-executable instructions are stored on memory 510.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 501, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 501 can include or be in communication with an electronic display 535 that comprises a user interface (UI) 540 for providing, for example, parking information. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 505. The algorithm can, for example, determine and provide parking information. The algorithm may be a machine learning algorithm (e.g., support vector machine), which may use user feedback (e.g., labeling the side-of-street, orientation, location of parking, and/or providing information on legality and timing of parking from street signs) to improve the determination of whether a vehicle is parked, where the vehicle is parked, and/or information about a parking location of the vehicle. The UI 540 may include graphical elements that permit the user to provide feedback. For example, the computer system 501 may query the user about whether the information about the parking location is correct, and the user can provide the computer system an indication as to whether the location is correct or not correct, and in some cases permit the user to correct the location. This can permit the computer system 501 to use the feedback to improve the manner in which the computer system 501 provides such information.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A computer-implemented method for providing parking information, comprising:
   (a) obtaining vehicle data from a mobile computing device of a user onboard the vehicle, wherein the mobile computing device comprises a Global Positioning System component and one or more accelerometers, and wherein the vehicle data is obtained using the Global Positioning System and the one or more accelerometers without use of any information from a sensor of the vehicle;
   (b) determining, using one or more programmed computer processors, whether the vehicle is parked from the vehicle data obtained from the Global Positioning System component and one the or more accelerometers comprised in the mobile computing device of the user onboard the vehicle without use of any information from the sensor of the vehicle;
   (c) determining, using the one or more programmed computer processors, a parking location of the vehicle from the vehicle data when the vehicle is parked; and
   (d) outputting the parking location of the vehicle determined in (c) to a graphical user interface of the mobile computing device of the user.

2. The method of claim 1, wherein determining the parking location includes determining one or more rules or parameters about the parking location.

3. The method of claim 1, wherein determining the parking location includes determining a sub-region or parking space of the vehicle within a parking lot or garage based on the vehicle data.

4. The method of claim 1, wherein determining the parking location includes determining a side of a street or an orientation of the vehicle when parked from the vehicle data.

5. The method of claim 1, further comprising using the vehicle data to determine that the vehicle is towed.

6. The method of claim 5, wherein the vehicle data includes sensor data.

7. The method of claim 1, wherein user feedback is used to improve the determination of whether the vehicle is parked, where the vehicle is parked, and/or information about the parking location.

8. The method of claim 7, wherein user feedback includes labeling the side-of-street, orientation, location of parking, and/or providing information on legality and timing of parking from street signs.

9. The method of claim 1, wherein the parking location is outputted on a user interface of the mobile computing device of the user or another mobile computer device.

10. The method of claim 1, wherein the parking location is determined using a database with historical parking records.

11. The method of claim 1, further comprising receiving input from the user about whether the parking location is correct or not correct.

12. The method of claim 11, wherein the input is received from the mobile computing device of the user.

13. The method of claim 1, wherein (a) comprises obtaining vehicle data from the vehicle and the mobile computing device of the user.

14. The method of claim 1, wherein the vehicle data comprises an accelerometer profile collected by an accelerometer of the mobile computing device, which accelerometer profile is a fingerprint of a parking event at the parking location.

15. A system for providing parking information, comprising:
   a communications interface that is in communication over a network with a mobile computer device of a user onboard the vehicle, wherein the mobile computing device comprises a Global Positioning System component and one or more accelerometers; and
   one or more computer processors operatively coupled to the communications interface, wherein the one or more computer processors are individually or collectively programmed to (i) obtain vehicle data from the Global Positioning System component and one or more accelerometers comprised in the mobile computing device of the user over the network, wherein the vehicle data is obtained using the Global Positioning System and the one or more accelerometers without use of any information from a sensor of the vehicle, (ii) determine whether the vehicle is parked from the vehicle data obtained from the Global Positioning System component and one the or more accelerometers comprised in the mobile computing device of the user onboard the vehicle, (iii) determine a parking location of the vehicle from the vehicle data when the vehicle is parked, and (iv) output the parking location of the vehicle determined in (iii) to a graphical user interface of the mobile computing device of the user.

16. The system of claim 15, wherein the one or more computer processors are individually or collectively programmed to determine the parking location by determining a sub-region or parking space of the vehicle within a parking lot or garage based on the vehicle data.

17. The system of claim 15, wherein the one or more computer processors are individually or collectively programmed to receive and employ user feedback to improve the determination of whether the vehicle is parked, where the vehicle is parked, and/or information about the parking location.

18. The system of claim 15, wherein the one or more computer processors are individually or collectively programmed to receive input from the user about whether the parking location is correct or not correct, which input is received from the mobile computing device of the user over the network.

19. The system of claim 15, wherein the one or more computer processors are individually or collectively programmed to obtain the vehicle data from the mobile computing device of the user onboard the vehicle, and determine whether the vehicle is parked from the vehicle data obtained from the mobile computing device of the user onboard the vehicle.

20. The system of claim 15, wherein the vehicle data comprises an accelerometer profile collected by an accelerometer of the mobile computing device, which accelerometer profile is a fingerprint of a parking event at the parking location.

21. A non-transitory computer-readable medium comprising machine executable code that, upon execution by one or more computer processors, implements a method for providing parking information, the method comprising:
   (a) obtaining vehicle data from a mobile computing device of a user onboard the vehicle, wherein the mobile computing device comprises a Global Positioning System component and one or more accelerometers, and wherein the vehicle data is obtained using the Global Positioning System and the one or more accelerometers without use of any information from a sensor of the vehicle;
(b) determining whether the vehicle is parked from the vehicle data obtained from the Global Positioning System component and one or more accelerometers comprised in the mobile computing device of the user onboard the vehicle;
(c) determining a parking location of the vehicle from the vehicle data when the vehicle is parked; and
(d) outputting the parking location of the vehicle determined in (c) to a graphical user interface the mobile computing device of the user.

* * * * *